(12) United States Patent
Kiester et al.

(10) Patent No.: US 8,117,650 B2
(45) Date of Patent: Feb. 14, 2012

(54) PROVISIONING USERS TO MULTIPLE AGENCIES

(75) Inventors: W. Scott Kiester, Orem, UT (US); Cameron Mashayekhi, Salt Lake City, UT (US); Karl E. Ford, Highland, UT (US)

(73) Assignee: Novell Intellectual Property Holdings, Inc., Seattle, WA (US)

( * ) Notice: Subject to any disclaimer, the term of this patent is extended or adjusted under 35 U.S.C. 154(b) by 1034 days.

(21) Appl. No.: 11/906,941

(22) Filed: Oct. 4, 2007

(65) Prior Publication Data

US 2009/0094161 A1    Apr. 9, 2009

(51) Int. Cl.
*G06F 7/04* (2006.01)
(52) U.S. Cl. .................. 726/9; 726/5; 713/186
(58) Field of Classification Search ............ 726/5, 9; 713/186
See application file for complete search history.

(56) References Cited

U.S. PATENT DOCUMENTS

| | | | |
|---|---|---|---|
| 4,123,747 A | 10/1978 | Lancto et al. | |
| 4,825,052 A | 4/1989 | Chemin et al. | |
| 6,023,704 A | 2/2000 | Gerard et al. | |
| 6,561,425 B2 | 5/2003 | Kresina et al. | |
| 6,725,269 B1 | 4/2004 | Megiddo | |
| 6,750,883 B1 | 6/2004 | Parupudi et al. | |
| 6,769,060 B1 | 7/2004 | Dent et al. | |
| 6,795,967 B1 | 9/2004 | Evans et al. | |
| 6,937,976 B2 | 8/2005 | Apte | |
| 6,985,887 B1 | 1/2006 | Sunstein et al. | |
| 7,249,092 B2 | 7/2007 | Dunn et al. | |
| 7,471,810 B2 * | 12/2008 | Awatsu et al. | 382/115 |
| 2003/0163686 A1 | 8/2003 | Ward et al. | |
| 2004/0122774 A1 | 6/2004 | Studd et al. | |
| 2004/0158723 A1* | 8/2004 | Root | 713/186 |
| 2006/0226951 A1 | 10/2006 | Aull et al. | |
| 2007/0040017 A1 | 2/2007 | Kozlay | |
| 2007/0061263 A1 | 3/2007 | Carter et al. | |
| 2007/0214493 A1 | 9/2007 | Davis | |

OTHER PUBLICATIONS

Novell, Inc., "Novell Identity Manager," www.novell.com/products/identity manager, 1 page, Sep. 14, 2007.
Novell, Inc., "Identity Assurance Solution," www.novell.com/products/identityassurance/overview.html, 1 page, Sep. 14, 2007.
Phillip L. Barber, Homeland Security Presidential Directive 12 (HSPD-12) Shared Services Provider II, Solicitation No. TQ-PLB-07-0002, RFQ #186901, General Services Administration Federal Acquisition Service, Office of Acquisition, Jan. 12, 2007, 141 pages.

\* cited by examiner

*Primary Examiner* — Christopher Brown
(74) *Attorney, Agent, or Firm* — King & Schickli PLLC

(57) ABSTRACT

Apparatus and methods are described for providing employee cards to employees, such as PIV cards to federal employees, including provisioning the employees to a more than one agency (and more than one card) without requiring multiple instances of enrolling and adjudicating the employee. Representatively, a sponsor enters information about the employee into a computer-displayed form (e.g., web-based). Biometric identity information is collected for the employee, but if such has already begun or is complete for at least a first agency, the collected information is used for a second agency without redundant collection. In the event an adjudication level of the first agency is at least as stringent as it is for the second agency, the employee is eligible to receive an employee card for the second agency, in addition to an employee card for the first agency.

20 Claims, 3 Drawing Sheets

PROVISIONING USERS TO MULTIPLE AGENCIES

FIELD OF THE INVENTION

Generally, the present invention relates to computing environments involving the distribution of identification cards to employees, such as personal identity verification (PIV) cards to Federal employees. Particularly, it optimizes the General Services Administration's (GSA's) provisioning process, including provisioning users to more than one agency by leveraging commonality in the process. Also, it relates to providing employee cards to state governments or other business enterprises having different physical and logical access systems at different locations. Various features relate to leveraging existing configurations by way of retrofits, computer program products and computing network interaction.

BACKGROUND OF THE INVENTION

Homeland Security Presidential Directive 12 (HSPD-12) mandates establishment of an identification program for Federal Government employees. Among other things, it is to provide credential-controlled physical and logical access to facilities and information systems. A personal identity verification (PIV) card will be used to gain access, and such will comport with Federal Information Processing Standards (FIPS) promulgated by the Department of Commerce and the National Institute of Standards and Technology (NIST).

The GSA's Federal Acquisition Service also has launched programs providing assistance to Federal agencies, commissions, boards, organizations, militaries, etc. (hereafter collectively agencies), in producing compliant PIV cards. At a high level, they follow the four-steps of sponsorship, enrollment (including biometric identity information), adjudication and activation. In more detail, the steps include:

Sponsorship: An authorized federal employee (sponsor), per a given agency, submits a request for a PIV card on behalf of an applicant. The sponsor basically provides baseline identity information about the applicant, e.g., name, address, phone number, education, etc.

Enrollment: A designated registrar captures the baseline identity information, breeder documents and biometric identity information. Among the biometric identity information, the registrar collects fingerprints and takes a photograph of the applicant. Depending upon job level, they may also administer and/or collect toxicology reports (blood and/or urine test), DNA samples, retina scans or the like. The registrar also enters physical attributes (e.g., height, weight, hair color, eye color, blood type, etc.). Once collected, the biometric identity information is submitted to the Integrated Database Management System (IDMS) for storage. Three types of enrollment consist of: enrolling a never-before enrolled applicant; re-enrolling an applicant for issuance of a new PIV card after theft, loss, defect, etc.; and re-enrolling based on status change (i.e., change of agency or affiliation).

Adjudication (Inherently a Federal Government function): The applicant undergoes a background check, such as an FBI check and a NACI, and such is based upon, in whole or part, the collected enrollment information.

Activation: Upon successful adjudication, the applicant appears in person to receive their PIV card and is verified, such as by biometric authentication, e.g., optical scan, fingerprint match, etc. Second, various computing keys and certificates are generated and loaded on the card, such as placing an X.509 certificate on a PIV card, thereby provisioning the user to logical and physical access systems of the agency.

Also, it presently exists that certain software products are available in the marketplace for use in implementing one or more of the foregoing steps. One particular product is the Identity Assurance Solution (IAS) software offering, provided by Novell, Inc. (the assignee of this invention). In general, an Identity Manager (IDM) integrates logical security of a site based on Identity Smart Cards and Physical site management. The logical portion of IDM associates users to agencies and organizations using the physical and logical infrastructures and resources.

By way of the strictures of HSPD-12, however, current IAS software offerings only allow users to have one card. There may be situations now or in the future, though, where several federal agencies (and/or sub-agencies) share employees and/or the same IAS software offering. In such a situation, some users will be enrolled in multiple agencies, and will require a separate card for each agency, or a single card with multiple credentials. Completing the entirety of the steps of sponsorship, enrollment, adjudication and activation, per each agency, will introduce redundancies, since the biometric identity information of the user or applicant remains valid for certain periods of time (or indefinitely, depending upon the type of information) and adjudication is based on common principals Accordingly, there is need in the art of employee cards to optimize existing resources. Particularly, there is need to provision users to more than one federal agency, by leveraging commonality in the GSA provisioning process. In that the art of providing employee cards is not limited to the federal government, or their disbursement of PIV cards, there is further need to supply state governments or other business enterprises with employee cards for different physical and logical access systems found at different locations. Because many computing configurations already have existing employee-card provisioning technology, it is further desirable to leverage existing configurations by way of retrofits, thereby avoiding the costs of providing wholly new products. Taking advantage of existing frameworks, such as the IAS software offering by Novell, Inc., is another feature in optimizing existing resources. Any improvements along such lines should further contemplate good engineering practices, such as automation, relative inexpensiveness, stability, ease of implementation, security, fraud protection, flexibility, etc.

SUMMARY OF THE INVENTION

The foregoing and other problems become solved by applying the principles and teachings associated with the hereinafter-described provisioning users to multiple agencies. At a high level, methods and apparatus are described that provide employee cards for employees, such as PIV cards for federal employees, including provisioning the employees to more than one agency (and more than one card) without requiring multiple instances of enrolling and adjudicating the employee. Also, it provides a system for aggregating data and business processes for the provisioning of multiple physical and logical authorization and authentication devices to a single user.

In a representative embodiment, a sponsor enters information about the employee into a computer-displayed form (e.g., web-based). Biometric identity information is collected for the employee, but if such has already begun or is complete for at least a first agency, and remains valid, the collected information is used for a second agency without redundantly collecting it again. (Skilled artisans will recognize that certain biometric identity information remains valid for certain periods of time, e.g., toxicology reports, or indefinitely, e.g., DNA sample.) In the event an adjudication level of the first agency is at least as stringent as it is for the second agency, the employee is eligible to receive an employee card for the second agency, in addition to an employee card for the first agency.

As a result, the invention provides: 1) the sharing of biometric data for multiple employee cards in the same system; 2) the usage of an expiration date to determine when or if the data should be re-collected; 3) the ability for one agency or organization to adjudicate a user, and have that adjudication apply to others in the same system; and 4) the ability to provision the employee card to different physical and logical access systems for each agency. In a broader sense, the invention is available for use: 1) in the issuance of virtually any type of credential or authentication device, not just employee cards/smart cards; or 2) without issuing any type of employee card or credential at all, but simply as a background check and biometric data collection system.

Computer program products are also disclosed. For instance, a product available as a download or on a computer readable medium has components to: to provide a computer-displayed form for a sponsor to enter information about the employee for each of the many employer's agencies; to electronically arrange and store collected biometric identity information of the employee; to electronically search and determine whether the collected biometric identity information for the employee has been completed for at least one other agency and, if so, using it for still another agency; and to determine whether one agency has an adjudication level at least as great as the adjudication level for another agency and, if so, deeming the employee for receipt of the employee card for the another agency thereby provisioning the employee to the another agency without requiring multiple instances of the enrolling and the adjudicating.

The IAS software architecture is also exploited as part of the invention to leverage existing resources.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for provisioning users to multiple agencies are hereinafter described.

Figure 1:
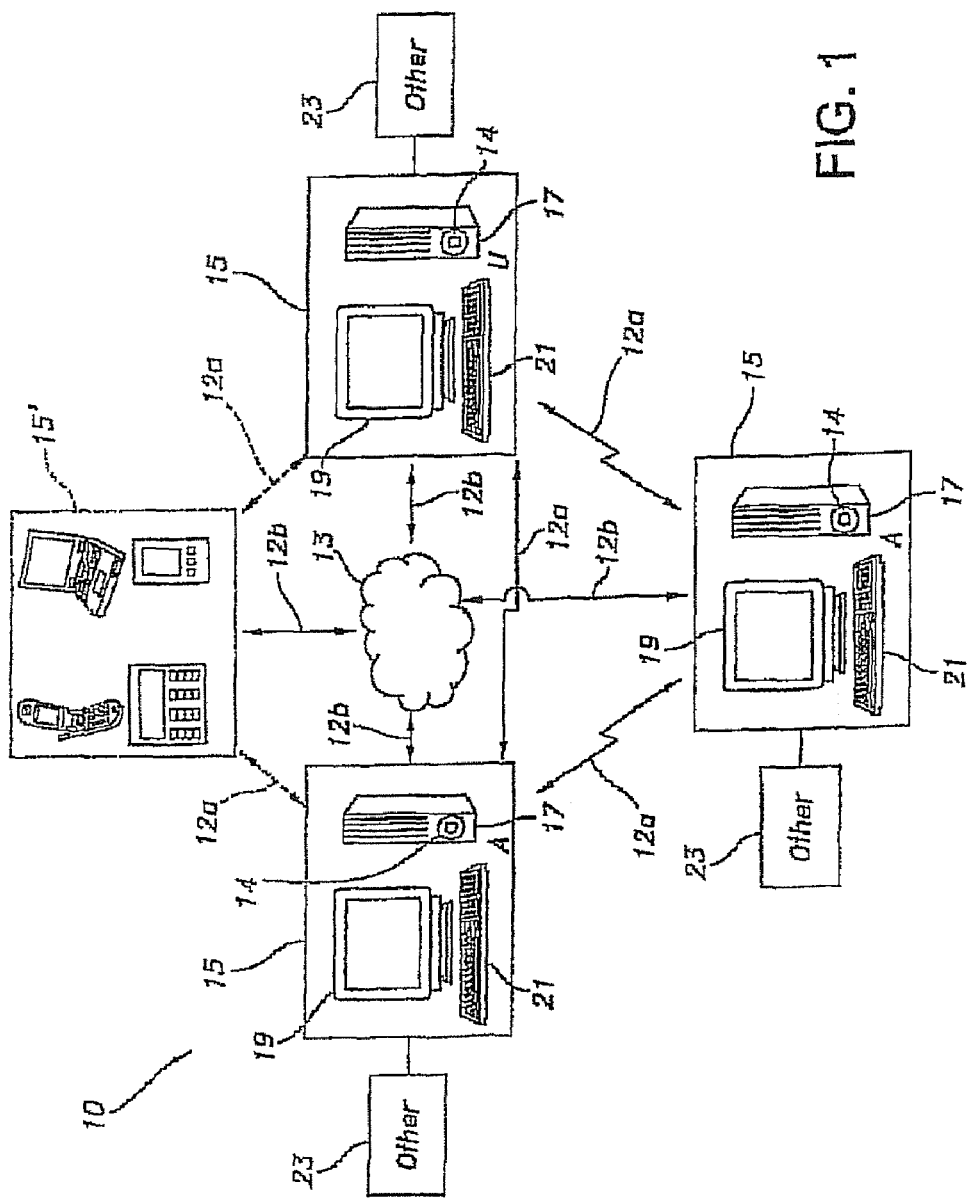
FIG. 1 is a diagrammatic view in accordance with the present invention of a representative computing environment for provisioning users to multiple agencies.

With reference to FIG. 1, a representative computing environment 10 for practicing the invention includes one or more computing devices 15 or 15', per users or agencies alike, arranged as individual or networked physical or virtual machines, including clients or hosts arranged with a variety of other networks and computing devices. In a traditional sense, an exemplary computing device typifies a server 17, such as a grid or blade server. Alternatively, it includes a general or special purpose computing device in the form of a conventional fixed or mobile computer 17 having an attendant monitor 19 and user interface 21. The computer internally includes a processing unit for a resident operating system, such as DOS, WINDOWS, MACINTOSH, VISTA, UNIX, and LINUX, to name a few, a memory, and a bus that couples various internal and external units, e.g., other 23, to one another. Representative other items 23 include, but are not limited to, PDA's, cameras, scanners, printers, microphones, joy sticks, game pads, satellite dishes, hand-held devices, consumer electronics, minicomputers, computer clusters, main frame computers, a message queue, a peer machine, a broadcast antenna, a web server, an AJAX client, a grid-computing node, a peer, a virtual machine, a web service endpoint, a cellular phone, or the like. The other items may also be stand alone computing devices 15' in the environment 10 or the computing device itself.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., software, as part of computer program products on readable media, e.g., disk 14 for insertion in a drive of computing device 17. Computer executable instructions may also be available as a download or reside in hardware, firmware or combinations in any or all of the depicted devices 15 or 15'.

When described in the context of computer program products, it is denoted that items thereof, such as modules, routines, programs, objects, components, data structures, etc., perform particular tasks or implement particular abstract data types within various structures of the computing system which cause a certain function or group of functions. In form, the computer product can be a download or any available media, such as RAM, ROM, EEPROM, CD-ROM, DVD, or other optical disk storage devices, magnetic disk storage devices, floppy disks, or any other medium which can be used to store the items thereof and which can be assessed in the environment.

In network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, modems, T1 lines, satellites, microwave relays or the like. The connections may also be local area networks (LAN) and/or wide area networks (WAN) that are presented by way of example and not limitation. The topology is also any of a variety, such as ring, star, bridged, cascaded, meshed, or other known or hereinafter invented arrangement.

With the foregoing representative computing environment as backdrop, the invention builds on the earlier-described GSA provisioning program consisting of the four-steps of sponsorship, enrollment (including biometric identity information), adjudication and activation. Namely, optimization occurs by provisioning employees to more than one agency (and more than one card) without requiring multiple instances of the steps of enrollment and adjudication. In business logic, the first time a user applies for an employee card, they go through the four steps, as is typical. However, if a user applies for subsequent card(s) in other agencies, they may be able to skip one or more steps. As a result, a single user's account may be linked to multiple employee cards (e.g., PIV cards); each employee card may be managed by separate sites/agencies independently of each other; time consuming and costly processes like biometric enrollment and adjudication are not repeated unnecessarily for each card; and the employee card may be provisioned to different logical and physical access systems, depending on which site or agency requested it. To reiterate the processing steps, they include (and are incorporated herein as part of the description of the present invention):

Sponsorship: An authorized federal employee (sponsor), per a given agency, submits a request for a PIV card on behalf of an applicant. The sponsor basically provides baseline identity information about the applicant, e.g., name, address, phone number, education, etc.

Enrollment: A designated registrar captures the baseline identity information, breeder documents and biometric identity information. Among the biometric identity information, the registrar collects fingerprints and takes a photograph of the applicant. Depending upon job level, they may also administer and/or collect toxicology reports (blood and/or urine test), DNA samples, retina scans or the like. The registrar also enters physical attributes (e.g., height, weight, hair color, eye color, blood type, etc.). Once collected, the biometric identity information is submitted to the Integrated Database Management System (IDMS) for storage. Three types of enrollment consist of: enrolling a never-before enrolled applicant; re-enrolling an applicant for issuance of a new PIV card after theft, loss, defect, etc.; and re-enrolling based on status change (i.e., change of agency or affiliation).

Adjudication (Inherently a Federal Government function): The applicant undergoes a background check, such as an FBI check and a NACI, and such is based upon, in whole or part, the collected enrollment information.

Activation: Upon successful adjudication, the applicant appears in person to receive their PIV card and is verified, such as by biometric authentication, e.g., optical scan, fingerprint match, etc. Second, various computing keys and certificates are generated and loaded on the card, such as placing an X.509 certificate on a PIV card, thereby provisioning the user to logical and physical access systems of the agency. After activation, the PIV cards are ready for use.

Figure 2:
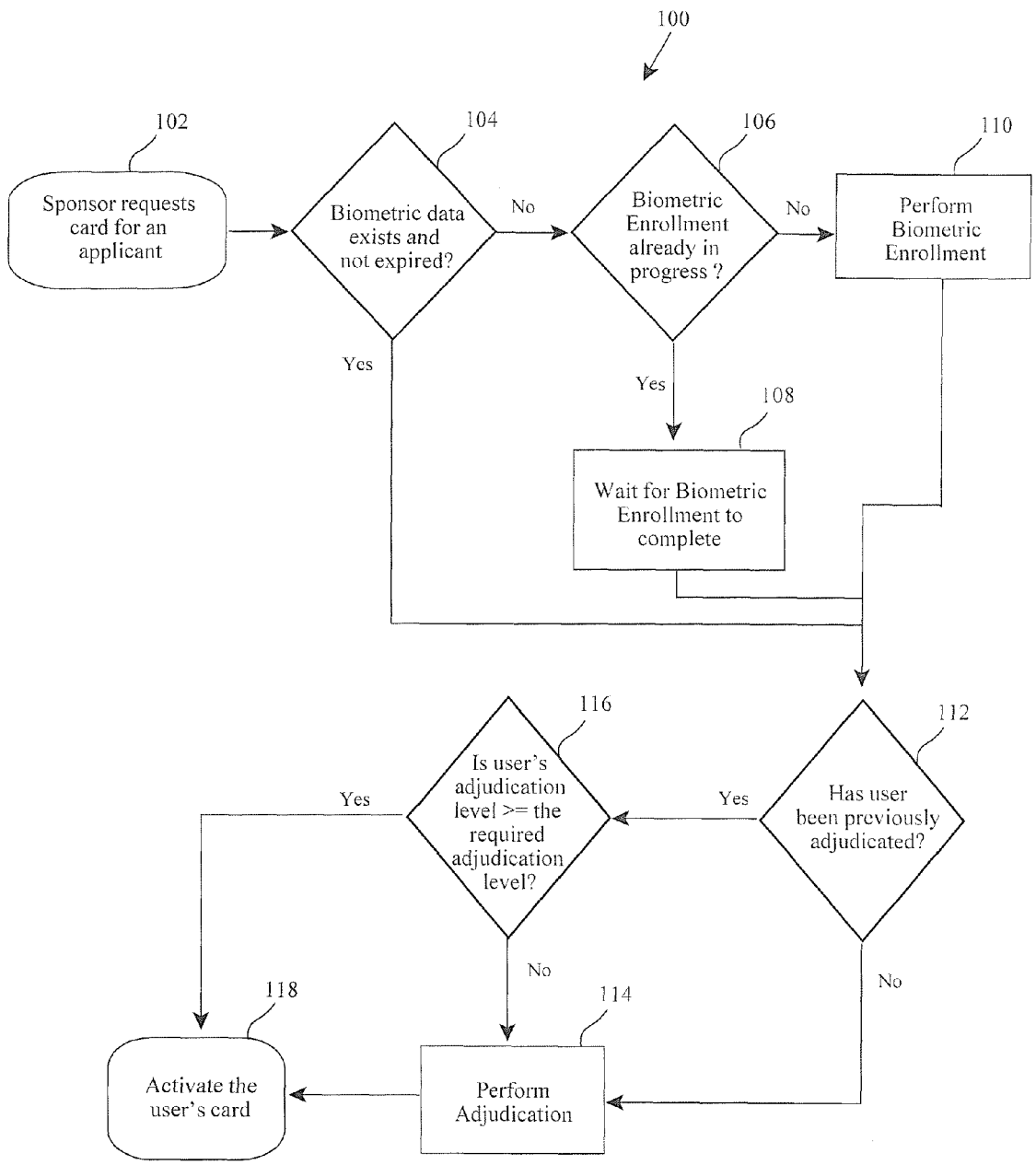
FIG. 2 is a high-level flow chart in accordance with the present invention for provisioning users to multiple agencies without requiring multiple instances of enrollment and adjudication.

With reference to FIG. 2, the process of the present invention is given generically as 100 and may be implemented in whole or part as executable instructions in the computing environment of FIG. 1, including or not as a retrofit to the existing IAS software offering by Novell, Inc. In more detail, a sponsor requests an employee card for an applicant-employee, such as a PIV card for a federal employee of a federal agency, step 102. In a preferred embodiment, this includes providing a computer-displayed form on a monitor in the computing environment (e.g., web-based form) for entry of basic information about the applicant, e.g., name, address, phone number, education, job for which applicant is applying, etc.

However, if the enrolling of the applicant has been completed for another agency (and the data is not expired) or already begun, but not completed, further determinations at steps 104 and 106 are made, respectively. For instance, if the enrollment, including collecting biometric identity information, has already been completed for a first agency, step 104, further inquires are executed to determine whether the collected data has expired. To the extent the data is not expired, it can be used as-is for a second agency and processing proceeds to step 112. On the other hand, if the biometric data is expired, or not found anywhere in existence, the processing proceeds to step 106 to determine whether or not the enrollment of an applicant has even begun.

As a working example, consider the administration and collection of a toxicology data, per a blood or urine test. If the data for an applicant was gathered more than ten months ago and, a predetermined policy establishes that all toxicology reports need to be less than six months old to be effective, application of the policy to the situation at hand dictates the administration of a new toxicology report. In other words, the collected data has expired and needs to be refreshed. Alternatively, if the toxicology report was only a few weeks old, the policy would dictate that the data is "non-expired" and available for use in enrollment at a second agency. Similarly, certain data, e.g., a DNA sample, a fingerprint, etc., may be deemed non-expired for as long as it is in existence, in which case, the data is not expired and can be used by another agency.

To the extent step 106 needs to be invoked, such as with an expired toxicology report, or if no biometric data exists, further processing determines whether any enrollment is in progress for any agency. (In a representative embodiment, this includes searching various databases for stored biometric information of the employee.) If so, the enrolling continues at step 108, until such time as it is complete, and then advances to step 112. If not, typical enrollment (such as for a first-time applicant) begins at step 110. In one instance, this consists of receiving a submitted computer-displayed form by the sponsor and coordinating electronic communications on various computing devices, e.g., the sending of emails to the registrar to begin scheduling toxicology tests, retina scans, DNA collection, fingerprinting, etc. Eventually, the enrollment step completes and processing turns to step 112.

At step 112, a determination is then made that assesses whether the applicant has ever been previously adjudicated on the merits of the collected biometric identity information. If not, adjudication occurs at step 114 as is typical in the prior art. However, if adjudication has already occurred, a further inquiry at step 116 asks whether the previous adjudication level for the earlier agency to which the employee applied is at least as great as the adjudication level for the present agency under consideration. For example, a first agency might have required adjudication comparable to issuing a government TOP SECRET clearance. To the extent the federal applicant is applying to a second agency needing only adjudication comparable to issuing a government SECRET clearance, the earlier adjudication level is sufficiently stringent to proceed to activating the user's employee card for the second agency, based on the first agency, at step 118. If not, however, adjudication returns to step 114 for actual undertaking. In other words, the adjudication level indicates how stringent of a background check was performed on the user. Subsequent agencies need only adjudicate the user if they require a more stringent version.

Figure 3:
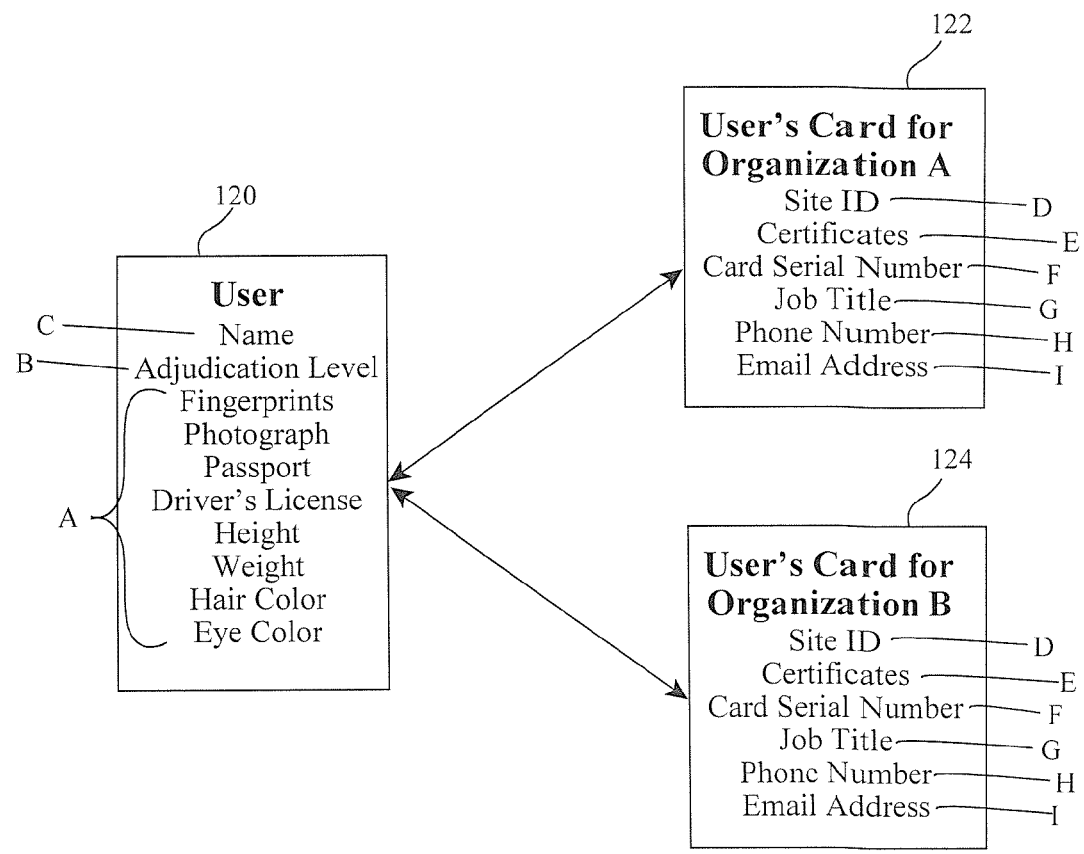
FIG. 3 is a diagrammatic view in accordance with the present invention of a representative embodiment of splitting user and employee card data across separate directories.

Ultimately, both the steps of enrollment and adjudication can be used for a second agency, if previously done for a first agency, and such avoids duplicity in the GSA provisioning process. Provided the biometric data of enrollment is current/non-expired or already begun for a first agency, and the adjudication level for the first agency is at least as stringent as that for the second agency, an employee-applicant can be provisioned to the second agency (and second employee card) without requiring multiple instances of enrollment and adjudication. Appreciating, too, the foregoing will have components in software, FIG. 3 shows how representative user and employee card data might be split across separate eDirectory objects, such as in an IAS software offering.

Namely, the User data at 120 includes items such as biometric identity information (A), an adjudication level already completed (B) and basic information (C). At 122 and 124, the employee card or User Card data includes those items particular to the agency or organization of interest, such as which location or site is under consideration (D), computing certificates of the card (E), e.g., X.509, employee card number (F), employee job title (G), phone number (H), email address (I), etc. Of course, the business logic will also need to appropriately place scripts, for example, such that the software can examine whether the enrolling is already in progress, or has been complete, or expired, e.g., steps 104, 106. Similarly, it will include items to examine the stringentness of a level of adjudication between agencies, e.g., step 116. In other business items, it will be contemplated where notices are to be sent, resolution of differences in notifications between agencies (e.g., two email addresses (I) exist for one employee provisioned to organization A and B, but maybe only one notification need be sent to one or the other, but not both), or the like.

In any embodiment, certain advantages and benefits over the prior art should be now readily apparent. For example, but not limited to, the invention provides advantage over the art according to: 1) the sharing of biometric data for multiple employee cards in the same system; 2) the usage of an expiration date to determine when data should be (re)collected, if necessary; 3) the ability for one organization to adjudicate a user, and have that adjudication apply for all users in the system; 4) the ability to provision the employee card to different physical and logical access systems for each organization; 5) linking a single employee's account to multiple employee cards; 6) the managing of each employee card by separate sites/agencies, independently of each other; 7) the avoidance of time consuming and costly processes like biometric enrollment and adjudication, per each employee card.

In extensions to the invention, the foregoing could be used for the issuance of virtually any type of credential or authentication device, not just smart cards. Alternatively, the invention could be used without issuing any type of card or credential at all. It could be used simply as a background check and biometric data collection system.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing system environment, a method of providing employee cards to an employee requiring one employee card per one of many employer's agencies, comprising:
   sponsoring the employee for each of the many employer's agencies, the sponsoring including providing a computer-displayed form for a sponsor to enter information about the employee;
   determining whether biometric enrolling for the employee has already begun or been completed for at least one agency of the many employer's agencies and, if so, using the biometric enrolling for another agency of the many employer's agencies, the determining including searching various databases of the many employer's agencies for collected biometric information of the employee and determining whether the collected biometric information is valid; and
   based on the biometric enrolling and determining, adjudicating the employee for receipt of the employee card for the at least one agency of the many employer's agencies, wherein if the adjudicating is successful and the at least one agency has an adjudication level at least as great as the adjudication level for the another agency, concurrently authorizing the employee for receipt of a second employee card for the another agency without repeating the biometric enrolling and adjudicating, thereby provisioning the employee to the another agency without requiring multiple instances of the enrolling and the adjudicating.

2. The method of claim 1, further including activating the employee card and the second employee card, the employee card and the second employee card being physically one or more than one card.

3. The method of claim 2, wherein the activating further includes generating computing keys and loading computing certificates relative to the employee card and the second employee card.

4. The method of claim 1, further including electronically logging and storing varieties of the sponsoring, the enrolling or the adjudicating.

5. The method of claim 1, further including providing executable code indicating whether the biometric enrolling for the employee has already begun or been completed for the at least one agency of the many employer's agencies.

6. The method of claim 1, further including initiating the biometric enrolling after the sponsoring by coordinating electronic communications on various computing devices after receiving the computer-displayed form from the sponsor.

7. The method of claim 1, wherein the determining whether the biometric information is valid includes determining whether the biometric enrolling includes expired biometric data of the employee.

8. The method of claim 1, wherein if the at least one agency does not have the adjudication level at least as great as the adjudication level for the another agency, adjudicating the employee before receipt of the second employee card for the another agency.

9. In a computing system environment, a method of providing PIV cards to a federal employee requiring one PIV card per one of many federal agencies, comprising:

sponsoring the federal employee for a first agency of the many federal agencies, the sponsoring including providing a computer-displayed form for entering information about the federal employee;

enrolling the federal employee for the first agency, including collecting biometric identity information of the federal employee and electronically storing at least some of the collected biometric identity information;

based on the enrolling, adjudicating the federal employee for receipt of a PIV card for the first agency;

activating the PIV card if the adjudicating is successful;

sponsoring the federal employee for a second agency of the many federal agencies, including providing another computer-displayed form;

using the enrolling of the federal employee for the first agency as enrolling for the second agency, including searching various databases of the many agencies for the electronically stored at least some of the collected biometric identity information including determining whether the at least some of the collected biometric identity information is valid;

determining whether the first agency has an adjudication level at least as great as the adjudication level for the second agency; and if so, activating a second PIV card for the federal employee for the second agency without repeating the enrolling and the adjudicating, thereby provisioning the federal employee to the second agency without requiring multiple instances of the enrolling and the adjudicating.

10. The method of claim 9, wherein the activating the PIV card and the second PIV card further includes activating to different physical or logical access systems, the PIV card and the second PIV card being physically one or the same card.

11. The method of claim 10, wherein the activating further includes generating computing keys and loading computing certificates relative to the PIV card and the second PIV card.

12. The method of claim 9, further including providing executable code indicating locations where the collected biometric identity information is stored.

13. The method of claim 9, further including initiating the enrolling after the sponsoring by coordinating electronic communications on various computing devices after receiving the computer-displayed form from the sponsor.

14. The method of claim 9, wherein the determining whether the collected biometric identity information is valid includes determining whether the collected biometric identity information has an associated expiration date.

15. The method of claim 9, wherein if the first agency does not have the adjudication level at least as great as the adjudication level for the second agency, adjudicating the federal employee before activation of the second PIV card.

16. A computer program product available as a download or on a non-transitory computer readable medium having executable instructions for installation on one or more computing devices in a computing environment for providing employee cards to an employee requiring one employee card per one of many employer's agencies, comprising:

a first component for providing a computer-displayed form for a sponsor to enter information about the employee for each of the many employer's agencies;

a second component for electronically arranging and storing collected biometric identity information of the employee;

a third component for electronically searching various databases of the many employer's agencies and determining whether the collected biometric identity information for the employee has been completed for at least one agency of the many employer's agencies and, if so, for using the collected biometric identity information for another agency of the many employer's agencies; and a fourth component for determining whether the at least one agency has an adjudication level at least as great as the adjudication level for the another agency and, if so, for authorizing the employee for receipt of the employee card for the another agency without repeating a step of enrolling and a step of adjudicating, thereby provisioning the employee to the another agency without requiring multiple instances of the enrolling and the adjudicating.

17. The computer program product of claim 16, further including a fifth component for activating the employee card to physical or logical access systems.

18. The computer program product of claim 16, further including a fifth component for generating computing keys and loading computing certificates relative to the employee card.

19. The computer program product of claim 16, further including a fifth component for initiating biometric enrolling after receiving the computer-displayed form from the sponsor by coordinating electronic communications on various computing devices.

20. The computer program product of claim 16, further including a fifth component for determining whether the collected biometric identity information has biometric data exceeding an expiration date.

* * * * *